May 9, 1933.  H. T. CLARKE ET AL  1,908,508
PROCESS OF DEHYDRATING AQUEOUS ACETIC ACID WITH TRICHLORETHYLENE
Filed Feb. 15, 1930  3 Sheets-Sheet 1

Hans T. Clarke &
Donald F. Othmer.
Inventors

Attorneys

Patented May 9, 1933

1,908,508

UNITED STATES PATENT OFFICE

HANS T. CLARKE, OF NEW YORK, AND DONALD F. OTHMER, OF ROCHESTER, NEW YORK, ASSIGNORS TO EASTMAN KODAK COMPANY, OF ROCHESTER, NEW YORK, A CORPORATION OF NEW YORK

PROCESS OF DEHYDRATING AQUEOUS ACETIC ACID WITH TRICHLORETHYLENE

Application filed February 15, 1930. Serial No. 428,641.

This invention relates to processes for removing water from aqueous acetic acid and particularly such processes in which a third component is added to the aqueous acid solution to remove the water therefrom by distilling the constant boiling mixture which is formed.

There have been numerous methods suggested, both for laboratory and commercial purposes, for the removal of water from aqueous acetic acid solutions. For example, the aqueous acetic acid solution is subjected to extraction by a solvent having greater solvent action for the acetic acid than for the water and subsequently distilling from the separated extraction liquid the acetic acid and the extracting medium. Low boiling solvents such as ether or ethyl acetate have been suggested by Brewster for such an extraction process, while high boiling solvent materials such as wood tar oils, phenols and similar extracting media have been suggested by Suida. Another general method for conducting the concentration of acetic acid from aqueous solutions consists in adding to the aqueous acid solution a third component which is only slightly soluble in water but infinitely soluble in acetic acid and distilling from this mixture an azeotropic mixture of water, acetic acid and the third component. The efficiency of this latter type of process is governed largely by the proportion of water removed relative to the acetic acid that comes over during this part of the distillation process, the best third component being of course one which would carry over no acetic acid, but a fairly high proportion of water.

An object of the present invention is to provide a process that will be simple, inexpensive, and yet applicable to acid solutions of any strength, high or low. Another object is to provide a process which will be applicable not only to relatively pure aqueous solutions of acetic acid, but also to the production of concentrated and glacial acetic acid from crude aqueous acetic acids, such as those containing pyroligneous liquor from wood distillation. A further object is to provide a process in which distillation of the aqueous acid is carried out with the aid of an auxiliary organic liquid which combines the essential properties of such an auxiliary in a way not heretofore known. Other objects will hereinafter appear.

This application is in part a continuation of our application Serial No. 232,916, filed Nov. 12, 1927, defining the dehydration of aqueous acetic acid by the use of ethylene dichloride and azeotropic distillation.

Figure 1:
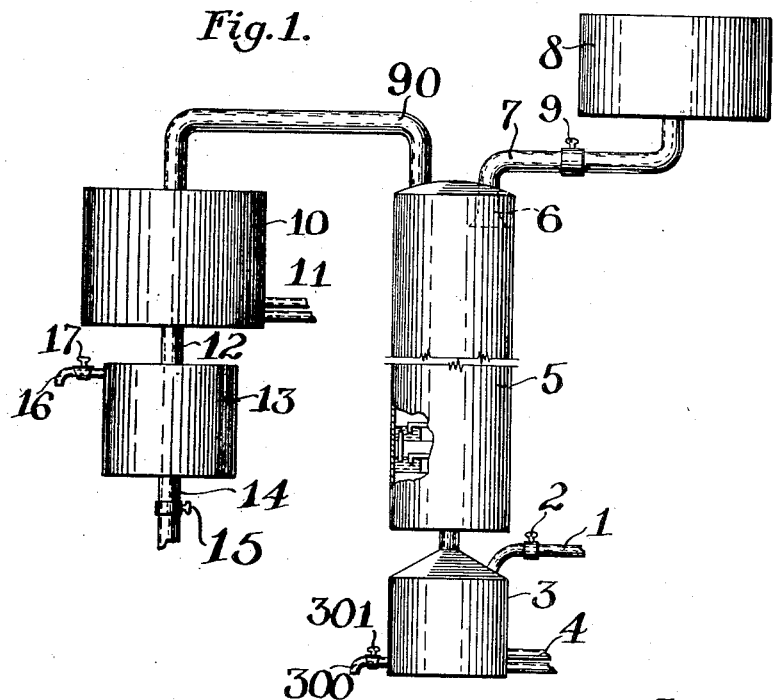
Figure 1 is a diagrammatic side elevation of one form of apparatus in which the process may be carried out, the parts being relatively exaggerated for the sake of clearness.

There are numerous technical processes, in which acetic acid is employed and from which the acetic acid somewhat diluted is recovered, in which it is necessary to reconcentrate the acetic acid for further use.

Such a process is employed in the preparation of cellulose acetate. In the acetylation of cellulose the acetic anhydride used is partly converted to acetic acid and this, together with the acetic acid added to the acetylating mixture as a diluent, constitutes the greater proportion of the cost of manufacturing this ester. It is therefore necessary, in order to economically produce cellulose acetate, that the acetic acid be recovered and preferably reconcentrated to as concentrated a form as possible. Up to the present time a large proportion of the acetic acid produced is prepared from the distillation of wood. The acid in this form, contaminated with empyreumatic impurities, together with wood tars and a large proportion of water, must likewise be concentrated to put it in condition for use in the art.

Our process of removing the water from aqueous acetic acid is primarily one of distillation in contradistinction to an extraction process. We have found that acetic acid can readily be concentrated from its aqueous solution if a third auxiliary liquid be added to the acetic acid during or prior to distillation. We have found likewise that an auxiliary liquid having many advantages for this purpose is trichlorethylene. The vapor obtained from the distillation of an aqueous solution of acetic acid to which trichlorethylene has been added will consist, after suitable rectification, in a binary azeotropic mixture of water and trichlorethylene and substantially no acetic acid.

By continuing such a rectification process, the preferred method of which is to be hereinafter described, the water is gradually removed from the acetic acid until there is produced an anhydrous acid which may, however, contain trichlorethylene depending on the amount originally added.

The process is preferably carried out in fractionating columns of known types, the distilled water and trichlorethylene being condensed and allowed to settle into two layers and the trichlorethylene which forms the lower layer being returned to the upper part of the column. A minute proportion of acetic acid may be carried over with the other vapors in which case the acid will be distributed between the water and trichlorethylene layers, although it will be understood that this proportion of acetic acid is really negligible and can be disregarded in most instances. In the preferred embodiment of our process, the trichlorethylene passes through a cycle without serious loss and can be used over and over again.

Trichlorethylene satisfies many of the requirements of an auxiliary liquid for use in distilling water from aqueous acetic acid in that it does not readily react with the acetic acid nor is it decomposed when boiled with that acid. It is likewise available in considerable quantities and at not too great a cost. It boils at a temperature below that of acetic acid and it can be readily and efficiently separated from that acid by distillation and rectification. It forms a binary azeotropic mixture with water, which mixture contains an appreciable proportion of water, but does not form such a constant boiling mixture with acetic acid nor does it form a ternary azeotropic mixture with water and acetic acid. It is likewise almost completely insoluble in water. The requirement that the concentration of acetic acid in the watery layer of the distillate be lower than that of the aqueous acetic acid which is being concentrated is likewise satisfied by the use of trichlorethylene as an auxiliary liquid. The latent heat of the solvent in the composition of the azeotropic mixture with water vapor is such that the amount of heat required for vaporizing a unit amount of water (in the azeotropic mixture) is likewise low.

Trichlorethylene is, therefore, useful in that it fulfills very well the above requirements for a good auxiliary liquid for the concentration of aqueous acetic acid solutions. Its boiling point at atmospheric pressure is approximately 87° C. (This is about 30° C. lower than that of acetic acid.) Thus the solution containing acetic acid and trichlorethylene can be readily separated into its two constituents by distillation. Trichlorethylene forms an azeotropic mixture with water vapor which boils under atmospheric pressure, at approximately 72° C. It is soluble in water to only a very slight extent, less than .1 per cent by weight at 20° C.

Using the proper rectifying column there is substantially no acid (less than ½ per cent) in the watery layer of the distillate. Since distillation and rectifying processes will not concentrate aqueous acids weaker than the watery layer of the distillate, and since our process in proper apparatus causes the presence of virtually no acid in such layer, our process can concentrate aqueous acetic acids of any strength—from less than 1 per cent to over 99 per cent.

Figure 4:
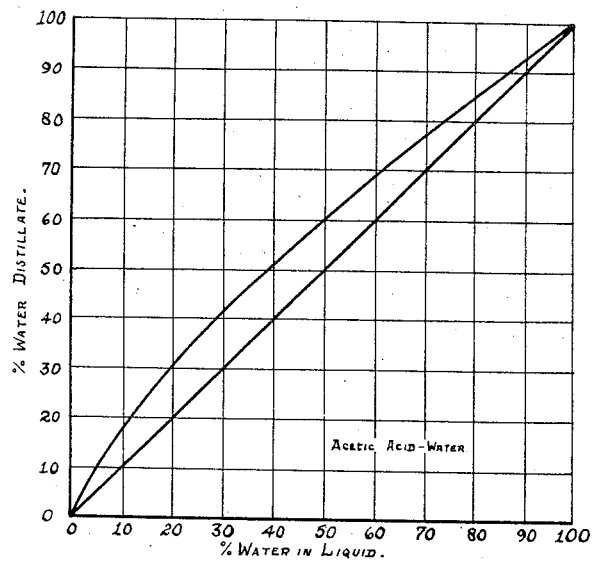
Figures 4 and 5 are charts showing the water removing possibilities from aqueous acetic acids of different concentrations if distilled alone and when distilled with an auxiliary liquid such as trichlorethylene.
Figure 5:
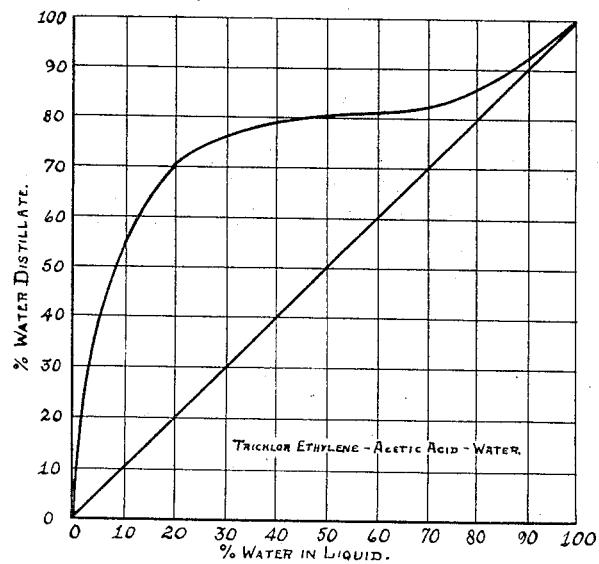

Reference to Figures 4 and 5 will show still further the special advantages of trichlorethylene as an auxiliary liquid. In each figure the abscissæ are the percentages of water relative to the weight of acid in the liquid being distilled without any rectification and the ordinates are the percentage of water relative to the acid in the watery layer of the distillate. In other words, such percentage of water was first determined in the liquid to be distilled. The latter was then distilled long enough to get a test distillate. The test distillate was allowed to settle to form a watery layer and the percentage of the water determined in this layer.

In each figure there is, for convenience, a straight line at 45° which indicates equality in the percentages. Points above this 45° line indicate that the water can be distilled off to concentrate the original acid.

Figure 4 shows the conditions when a mixture of acetic acid and water alone is distilled. It will be seen that, no matter what the strength of the aqueous acid is, the percentage of water in the corresponding distillate is only slightly greater, the curve being only a little above the straight line. This shows one reason why it is uneconomical to distill and rectify the aqueous acetic acid alone in order to effect concentration thereof.

Figure 5 gives the curve for a mixture of acetic acid, water and trichlorethylene. This curve was obtained by simple distillation. Let us assume, for example, that we are distilling an acetic acid solution containing 50 per cent water. In the Figure 4 it will be seen that a 50 per cent acetic acid water liquid will give a vapor containing approximately 62 per cent water. In Figure 5, on the other hand, when distilled in the presence of an excess of trichlorethylene, it will be noted that a 50 per cent liquid acetic acid will give a vapor, which, on condensation, yields an aqueous phase containing slightly more than 80 per cent water. The efficiency of rectifying and concentrating acetic acid may be regarded as being in approximately the same proportion as the increase in per cent of water in the water layer of the distillates obtained in the two cases. The advantage of our process is, therefore, apparent.

Referring to the accompanying drawings, Figure 1 shows diagrammatically one of the simplest ways in which our method may be carried out. The dilute aqueous acetic acid enters by pipe 1, controlled by valve 2 into the acid heater 3, the latter being heated by a steam jacket or steam coil in the conventional way through the pipe 4.

The vapors from the heated dilute acid enter the fractionating column 5, which may be of any of the well known types, such as that employing plates with bubble cap construction, and in this fractionating column meet a downward current or wash of trichlorethylene coming from the nozzle 6 sent through pipe 7 from supply 8, valve 9 controlling the flow. An azeotropic mixture of water vapor and trichlorethylene is obtained at the top of a sufficiently efficient column and passes through the pipe 90 into condenser 10, is cooled in any convenient way by cooling fluid supplied through pipe 11, and the condensate thus formed, passes through pipe 12 into the settling vessel 13. Here the distillate separates, by gravity, into two layers, the lower one being trichlorethylene which can be drawn off through pipe 14 which is controlled by valve 15. This trichlorethylene may then be reintroduced into supply 8. The upper layer is composed chiefly of water, but may contain small amounts of acetic acid and trichlorethlyene. It may be drawn off through pipe 16, controlled by valve 17. If the amount of trichlorethylene in it is of any consequence, this may be recovered by a flashing and condensing process—that is, one in which a current of steam is blown through the water and the trichlorethylene thus evolved is condensed. This operation may be conducted in an auxiliary column if desired. The liquid which finally results in vessel 3, will be completely dehydrated. Since an excess of trichlorethylene is used, say more than approximately 10 times the weight of water to be removed, the liquid in vessel 3 will finally become a dehydrated mixture of trichlorethylene and glacial acetic acid. This can be withdrawn through pipe 300 controlled by valve 301 and the two ingredients separated by fractional distillation in any usual apparatus, this being easy because of the wide difference in the boiling points of the two ingredients and the fact that no constant boiling mixture of acetic acid and trichlorethylene is formed.

Figure 2:
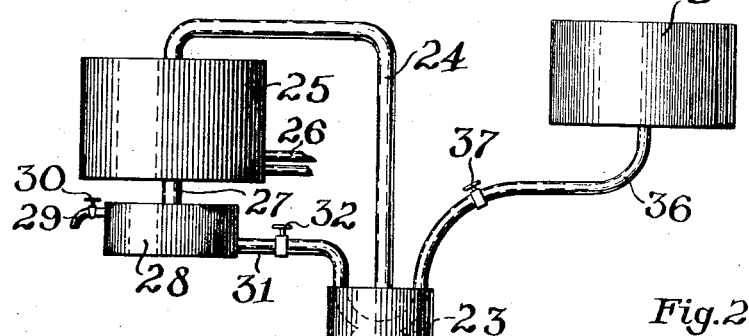
Figure 2 is a similar view of another apparatus in which the process may be carried out.
Figure 2:
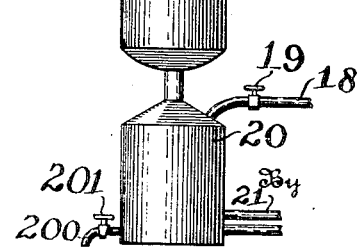

Figure 2 shows a further modification in which the major part of the trichlorethylene passes rapidly through a definite cycle.

The dilute aqueous acetic acid enters through pipe 18 controlled by valve 19 into the heating apparatus 20, the latter being supplied with the necessary heating fluids for its jacket or coils through pipe 21. The ascending vapors in fractionating column 22, of known type such as that provided with refractive packing, meet a descending spray or stream of trichlorethylene coming from the nozzle or opening 23. The azeotropic mixture of vapors, including water and trichlorethylene with possibly a trace of acetic acid passes through pipe 24 into the condenser 25, which receives its supply of cooling fluid through pipe 26. From the condenser it flows through pipe 27 into the settling vessel 28. The upper layer of water is drawn off through pipe 29, controlled by valve 30, and the lower layer of trichlorethylene is conducted back through nozzle 23 from the settling vessel 28 through pipe 31 controlled by valve 32. Also there is an auxiliary supply 35 of trichlorethylene from which the latter may be conducted to nozzle 23 through pipe 36 controlled by valve 37. This supply is merely to compensate for any losses which take place during the regular cycle of the trichlorethylene through elements 24, 25, 27, 28, 31 and 23. The water, which is drawn off, can be run to waste or any trichlorethylene contained therein flashed out and condensed, as explained above in connection with Figure 1. The dehydrated mixture of trichlorethylene and glacial acetic acid is drawn off from the heater 20 through the pipe 200, controlled by valve 201 and then fractionated to separate the ingredients, as is also above described.

Figure 3:
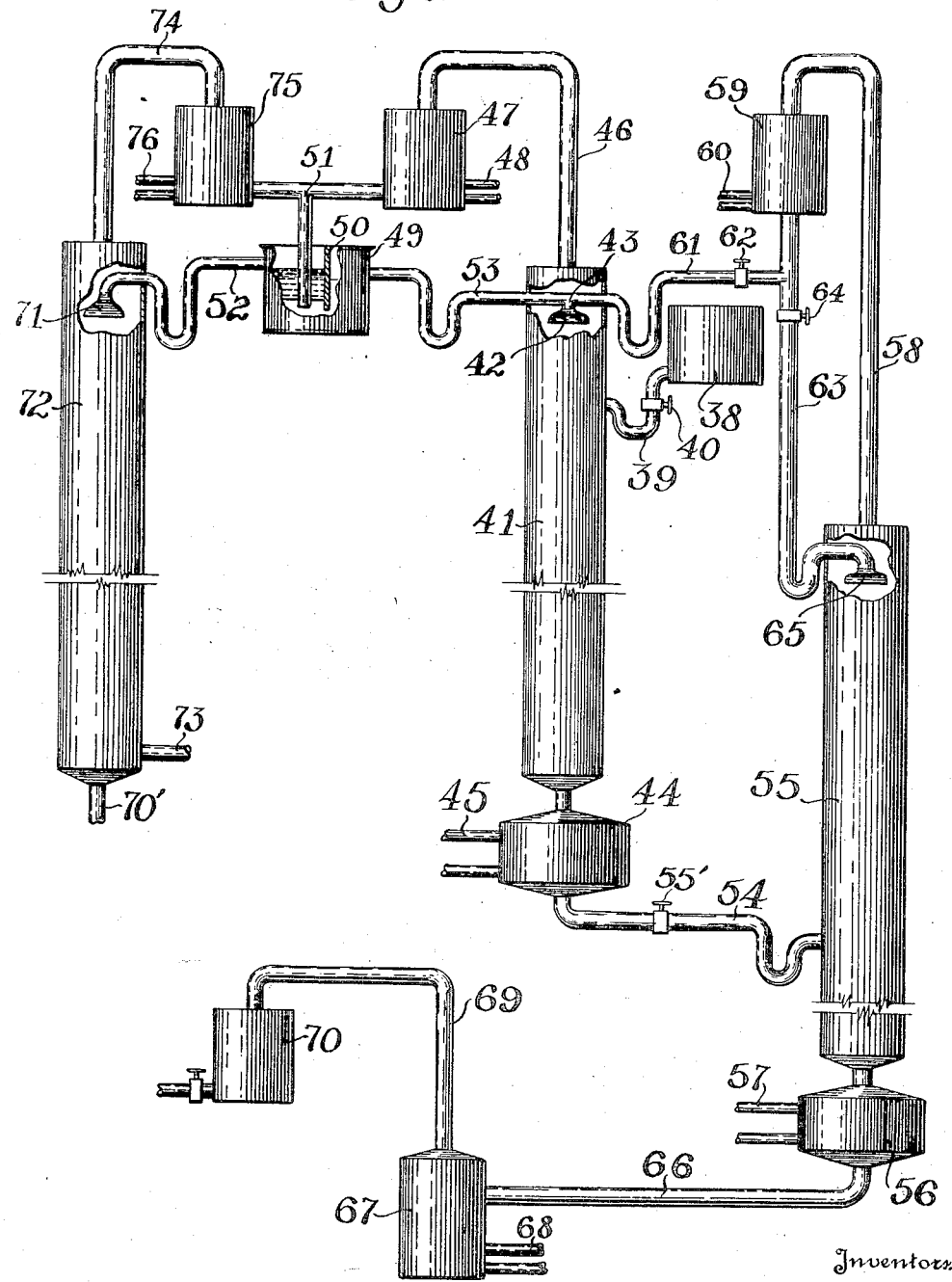
Figure 3 is a similar view of the preferred apparatus for carrying out our process.

Figure 3 shows diagrammatically the preferred apparatus for carrying out our invention. A supply tank of aqueous acetic acid 38 is connected by a pipe 39, controlled by valve 40, with an intermediate portion (say about two-thirds of the way up) of a fractionating column 41 of the usual type such as that provided with plates and bubble cap construction.

At the top of this column a downward current or spray of trichlorethylene enters from the nozzle or opening 42, which is connected with a horizontal transfer pipe 43. The base of the column is provided with the customary heating vessel 44, the heating fluid for which enters through the pipe 45. The azeotropic mixture of the vapors of water and trichlorethylene leaves the top of the column, passing through pipe 46 into condenser 47, the cooling fluid of which circulates through pipe 48. The condensate which collects in the condenser 47 flows down into the settling chamber 49, the latter being provided with a partition or baffle 50 extending downwardly to within a short distance from the bottom of the vessel. The pipe 51 connected to the condenser 47 likewise extends well down into the vessel 49. When the condensate reaches vessel 49, it separates into two layers, the water layer being uppermost and confined to one side of the partition 50, as shown in the drawing. From the vessel 49 the watery layer passes off through the pipe 52 to further treating apparatus which will be described hereinafter. The lower layer of trichlorethylene containing mere traces of acetic acid and water passes beneath the partition 50 and through pipe 53 to pipe 43 and then downwardly through the nozzle 42 into the fractionating column 41. Thus the bulk of the trichlorethylene passes through a cycle from nozzle 42 to column 41 and then through the following parts,—46, 47, 51, 49, 53 and 42.

But as there is an excess of trichlorethylene used,—namely more than about 10 parts by weight of the trichlorethylene for each part by weight of water to be eliminated, this means that some trichlorethylene will collect with the dehydrated or glacial acetic acid in the heated vessel 44. This dehydrated mixture is then conducted through pipe 54 controlled by the valve 551 to an intermediate portion of an auxiliary fractioning column 55 of one of the known types.

The heating for this column 55 is done in the chamber 56, the heating fluid for which circulates through the pipe 57. Vapors of trichlorethylene pass from the top of the column through pipe 58 into condenser 59, the cooling fluid of which circulates through pipe 60. This condensed trichlorethylene can be passed partly through pipe 61 controlled by valve 62 into pipe 43 and nozzle 42 of the main fractionating column, and partly through pipe 63 controlled by valve 64 and nozzle or opening 65 at the top of the column 55, there to act as a refluxing liquid for wash in the column.

The glacial acetic acid in vessel 56 is conducted through pipe 66 to a simple still 67, the heating fluid for which circulates through pipe 68. The vapors of acetic acid pass over through pipe 69 into the final condenser 70 from which the glacial acetic acid can be drawn off and stored. The distillation in still 67 is not indispensable, but it is preferable to remove some small amount of coloring of polymerized bodies that may be formed during the other operations.

Referring to the upper left hand part of Figure 3, the watery layer from the settling vessel 49 passes through pipe 52 to the nozzle or opening 71 at the top of the fractionating column 72, the latter being of any of the usual types. Steam is blown into the column through pipe 73 and hot water passes to waste through pipe 70′ preferably to a heat interchanger, not shown. Passage of the steam up through column 72 flashes off the small amount of trichlorethylene which is dissolved in the watery material descending from the nozzle 71. The vapors of trichlorethylene pass through pipes 74 into condenser 75, the cooling fluid of which circulates through pipe 76. The trichlorethylene from 75 passes through pipe 51 to the bottom or lower layer of the settling vessel 49 and thence returns to the normal circulatory path of the trichlorethylene through pipes 53 and 43 and nozzle 42.

It will be understood that in all forms of apparatus, the customary precautions for preventing heat losses by suitable insulation are observed and the parts which contact with the acid are made of materials resistant to corrosive action of acetic acid customarily employed for that purpose. Furthermore the process is preferably operated under atmospheric pressure conditions, although it can be conducted under either super-atmospheric pressure or subatmospheric pressure. When we refer herein to the boiling points of the ingredients and mixtures such, for instance, as the boiling point of water, we refer to those under the particular pressure conditions that are employed,—normally atmospheric.

From a consideration of the above disclosure, it will be evident that trichlorethylene may be used for effecting the concentration of acetic acid in quantities below that designated, in such cases it being evident that a complete dehydration of the acetic acid will not be effected; in some cases a complete dehydration may not be required.

What we claim as our invention and desire to be secured by Letters Patent of the United States is:

1. In the process of removing water from aqueous acetic acid, the steps of mixing therewith trichlorethylene and distilling water and trichlorethylene from the mixture.

2. In the process of removing water from aqueous acetic acid, the steps of mixing therewith trichlorethylene and distilling water and trichlorethylene from the mixture at a temperature below the boiling point of water.

3. In the process of removing water from aqueous acetic acid, the steps of mixing therewith more than approximately 10 parts by weight of trichlorethylene for each part of water to be removed and distilling water and trichlorethylene from said mixture.

4. In the process of removing water from aqueous acetic acid, the steps of mixing therewith more than about 10 parts by weight of trichlorethylene for each part of water to be removed and distilling off the water with part of the trichlorethylene, at a temperature below the boiling point of water and separating the dehydrated acetic acid from the remaining trichlorethylene.

5. In the process of removing water from aqueous acetic acid, the steps of mixing therewith trichlorethylene, distilling the mixture at a temperature below the boiling point of water to evolve a constant boiling mixture of water and trichlorethylene, condensing the latter mixture, allowing it to settle into layers and returning the lower layer to the original mixture undergoing distillation.

6. In the process of removing water from aqueous acetic acid, the steps of supplying said acid to a distilling column and during distillation therein adding trichlorethylene at the upper part of said column, and removing from the top of the column a constant boiling mixture of water and trichlorethylene at a temperature below the boiling point of water.

7. In the process of removing water from aqueous acetic acid, the steps of supplying said acids to a distilling column, during the distillation therein adding trichlorethylene at the upper part of said column, and removing from the top of the column a constant boiling mixture of water and trichlorethylene at a temperature below the boiling point of water, the weight of trichlorethylene added to said column being more than about 10 times the weight of water to be removed.

8. In the process of removing water from aqueous acetic acid, the steps of supplying said acid to an intermediate part of the distilling column, during the distillation therein adding trichlorethylene at the upper part of said column, removing from the top of the column a constant boiling mixture of water and trichlorethylene, condensing the latter mixture and whatever acid comes over with it, allowing it to settle into two layers, returning the lower layer to the upper part of the column and withdrawing the mixture of dehydrated acetic acid and trichlorethylene from the lower part of the column, and separating the former from the latter, the total weight of trichlorethylene added to the upper part of the column per unit time being more than about 10 times the weight of water distilled from the top of the column per unit time, and the temperature at which said constant boiling mixture is removed being below about 80° C.

9. The process of concentrating aqueous acetic acid, which comprises adding trichloroethylene to the aqueous acetic acid and distilling off the mixture of water and trichloroethylene.

10. The process of concentrating aqueous acetic acid, which comprises adding trichloroethylene to the aqueous acetic acid and distilling off the mixture of water and trichloroethylene, allowing it to settle and separate, and returning the trichloroethylene to the distilling vessel.

Signed at Rochester, New York this 11th day of February 1930.

HANS T. CLARKE.
DONALD F. OTHMER.